(12) United States Patent
Robb et al.

(10) Patent No.: US 11,125,107 B2
(45) Date of Patent: Sep. 21, 2021

(54) ROTOR CONSTRUCTION FOR HIGH SPEED MOTORS

(71) Applicant: INGERSOLL-RAND INDUSTRIAL U.S., INC., Davidson, NC (US)

(72) Inventors: James Lawrence Robb, China Grove, NC (US); Juha Tuomas Saari, Espoo (FI); George C. Hansen, Onalaska, WI (US)

(73) Assignee: INGERSOLL-RAND INDUSTRIAL U.S. INC., Davidson, NC (US)

(*) Notice: Subject to any disclaimer, the term of this patent is extended or adjusted under 35 U.S.C. 154(b) by 0 days.

(21) Appl. No.: 16/377,950

(22) Filed: Apr. 8, 2019

(65) Prior Publication Data

US 2020/0072079 A1    Mar. 5, 2020

Related U.S. Application Data

(63) Continuation of application No. 14/973,121, filed on Dec. 17, 2015, now Pat. No. 10,253,649.

(60) Provisional application No. 62/098,818, filed on Dec. 31, 2014.

(51) Int. Cl.
| | |
|---|---|
| *F01D 25/00* | (2006.01) |
| *F01D 5/02* | (2006.01) |
| *C09D 5/24* | (2006.01) |
| *F04D 29/02* | (2006.01) |
| *F04D 29/043* | (2006.01) |
| *H02K 1/22* | (2006.01) |
| *H02K 17/16* | (2006.01) |

(Continued)

(52) U.S. Cl.
CPC ............ *F01D 25/005* (2013.01); *C09D 5/24* (2013.01); *F01D 5/02* (2013.01); *F04D 29/02* (2013.01); *F04D 29/043* (2013.01); *H02K 1/22* (2013.01); *H02K 15/0012* (2013.01); *H02K 17/165* (2013.01); *F05D 2300/171* (2013.01); *F05D 2300/172* (2013.01); *H01B 1/026* (2013.01)

(58) Field of Classification Search
None
See application file for complete search history.

(56) References Cited

U.S. PATENT DOCUMENTS

2014/0306460 A1 * 10/2014 Donnelly .................. F02C 7/32
290/1 A

OTHER PUBLICATIONS

Callcut (High Copper Alloys—High Strength Coppers for Demanding Electrical Applications; Sep. 2006) (Year: 2006).*

* cited by examiner

*Primary Examiner* — Juan G Flores
(74) *Attorney, Agent, or Firm* — Kevin E. West; Advent, LLP

(57) ABSTRACT

A rotor shaft for a high speed motor that has a coating that is secured to a shaft body. The coating and the shaft body are formed from dissimilar materials. More specifically, the coating may be an alloy material, such as, for example, a copper alloy, while the shaft body may be a steel material. According to certain embodiments, the alloy material of the coating may be secured to at least a portion of a rotor body blank in a solution treated condition via a low temperature welding procedure. Additionally, the coating may be hardened, such as for example, through the use of an age hardening process. The coating and the rotor body blank may be machined together to form the rotor shaft. According to certain embodiments, such machining may configure the rotor shaft for use with a turbo-compressor that is configured for air compression.

20 Claims, 2 Drawing Sheets

(51) Int. Cl.
*H02K 15/00* (2006.01)
*H01B 1/02* (2006.01)

ROTOR CONSTRUCTION FOR HIGH SPEED MOTORS

CROSS REFERENCE TO RELATED APPLICATIONS

This application claims the benefit of U.S. Provisional Application No. 62/098,818, filed Dec. 31, 2014, which is incorporated herein by reference in its entirety.

BACKGROUND

A variety of different technologies, such as, for example, high speed, direct drive turbo-compressors, utilize high speed motors. Often, the operating speed of high speed motors, including asynchronous and synchronous motors, may be limited at least in part by the construction of the associated rotor. For example, due to the development of stresses in the magnet retention sleeve, typical permanent magnet motors may often be limited to achievable tip speeds of approximately 150 meters/second (m/s). Additionally, the laminated construction of asynchronous motors, such as, for example, induction motors, may also limit asynchronous motors to similar achievable tip speeds. Yet, to the detriment of the performance and reliability of the equipment that is being driven by the motor, lower tip speeds may impair the ability of the motor to obtain greater power density or more critical speed margins.

Prior attempts to overcome tip speed limitations have included the use of solid steel rotors. While such solid steel construction for the rotor may allow for higher achievable tip speeds, such as, for example, tip speeds in excess of 300 meters/second (m/s), and even tip speeds in excess of 500 meters/second (m/s), the electrical conductively of steel is typically too low for the associated machines to be designed with acceptable efficiency. Attempts to overcome conductivity deficiencies with solid steel rotors have included applying a copper coating to the solid steel rotor. Such construction utilizes the copper coating to carry an induced current at the surface of the rotor and to act as the rotor cage. Yet, with such construction, the peripheral speed of the rotor is limited to the coating strength and/or the strength of the bond between the copper coating and the steel rotor body. Further, the joining of dissimilar metals such as copper and steel, as well differences in their properties, such as, for example, melting temperatures, may limit the manner in which these two metals may be joined or bonded. For example, typically in rotor applications, the copper is applied to the steel rotor body via explosion welding, wherein the copper is able to come into close enough contact with the surface of the steel rotor body to form a weld. Yet, for at least certain applications, such bonding may be insufficient to allow the copper coated steel rotor to achieve the prerequisite degree of durability. For example, such bonding may be insufficient for turbo-compressor applications in which the motor is relatively frequently started and stopped and/or is exposed to relatively high temperatures.

BRIEF SUMMARY

One aspect of the present disclosure is a rotor shaft for a high speed motor. The rotor shaft includes a shaft body and a coating. The shaft body is configured for rotational displacement during operation of the high speed motor, and is constructed from a steel material. The coating is secured to at least a portion of an outer surface of the shaft body. Additionally, the coating is an alloy material that is configured to carry an induced electrical current for the rotational displacement of the shaft body. Further, the alloy material of the coating and the steel material of the shaft body are dissimilar materials.

Another aspect of the present disclosure is a method for manufacturing a rotor shaft body for a high speed motor. The method includes forming a rotor body blank from a steel material. Additionally, an alloy material, which is a material different than the steel material of the rotor blank, is solution heat-treated prior to the cladding operation. The solution treated alloy material is secured to at least a portion of the rotor body blank to provide a coating. Further, the coating may undergo subsequent heat treating, such as, for example, age hardening. Additionally, the rotor body blank and the coating are machined to form a rotor shaft that is configured for operation in a high speed motor.

Figure 1:
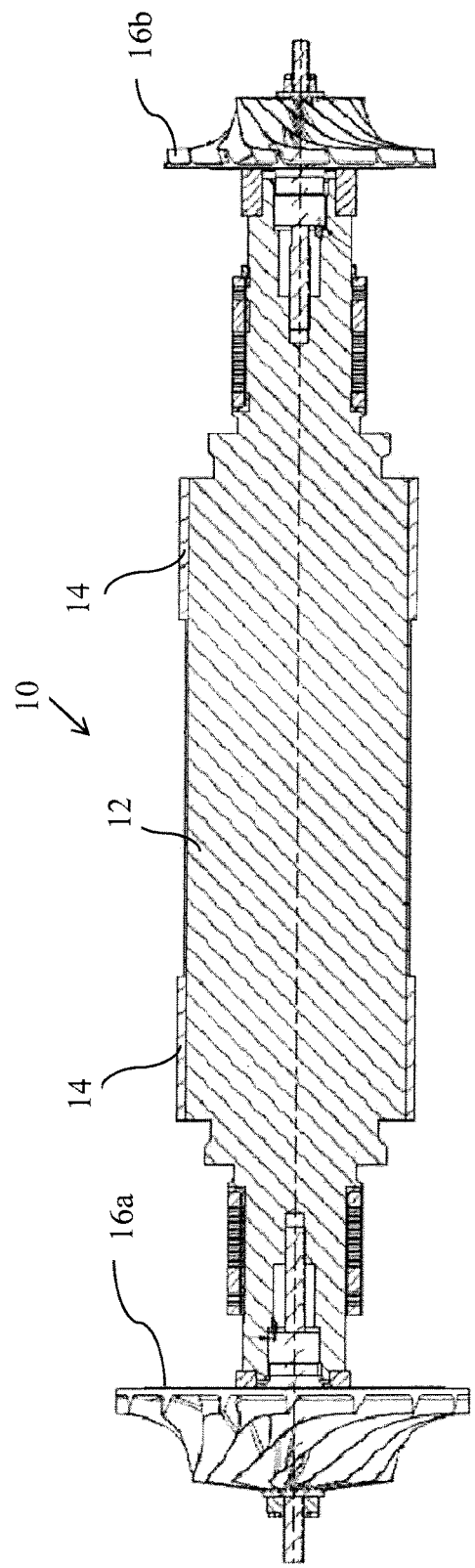
FIG. 1 is a cross sectional view of a rotor shaft body for a turbo-compressor that is at least partially coated with a dissimilar metal material according to an embodiment of the present disclosure.

The foregoing summary, as well as the following detailed description of certain embodiments of the present disclosure, will be better understood when read in conjunction with the appended drawings. For the purpose of illustrating the disclosure, there is shown in the drawings, certain embodiments. It should be understood, however, that the present disclosure is not limited to the arrangements and instrumentalities shown in the attached drawings.

DETAILED DESCRIPTION

FIG. 1 is a cross sectional view of a rotor shaft 10 for a turbo-compressor that includes a shaft body 12 that is at least partially coated with a coating 14 of a dissimilar material according to an embodiment of the present disclosure. As shown, in the illustrated embodiment, the shaft body 12 is operably connected to impellers 16a, 16b of low and high pressure compressors, respectively. According to the illustrated embodiment, the shaft body 12 has a generally unitary and/or solid body construction. For example, the shaft body 12 may be a forged, machined, and/or molded piece of metal, such as steel, that provides and/or assists in attaining the desired rotor shaft body 12 size(s) and configuration.

In the embodiment illustrated in FIG. 1, the coating 14 may be a metal that is dissimilar to the metal of the rotor shaft body 12. For example, according to the illustrated embodiment, the rotor shaft body 12 is constructed from steel, while the coating 14 can be a copper or copper alloy material, such as, for example, copper chromium (UNS No. C18200) or copper chromium zirconium (UNS No. C18150), among other copper alloys. Other suitable coating materials as would be known to one skilled in the art are also contemplated by the present disclosure. The selection of the material for the coating 14 may be based on a variety of different criteria. For example, the material for the coating 14 may be selected to improve the electrical connectivity characteristics of the rotor shaft 10 to levels beyond the connectively characteristics of the shaft body 12. Further, the material for the coating 14 may be selected based on the manner in which the coating 14 may be applied to and/or bonds with the material of the shaft body 12. Moreover, the coating 14 material may be selected based on the mechanical properties of the coating 14 and/or the properties of the bond between, or attachment of, the coating 14 and/to the shaft body 12.

Figure 2:
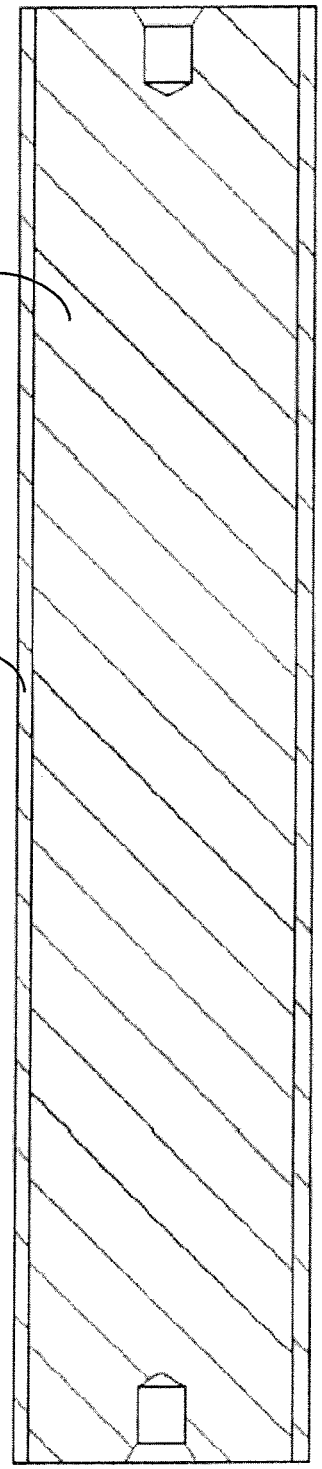
FIG. 2 is a cross sectional view of a rotor shaft body blank having a coating of a dissimilar material according to an embodiment of the present disclosure.
Figure 3:
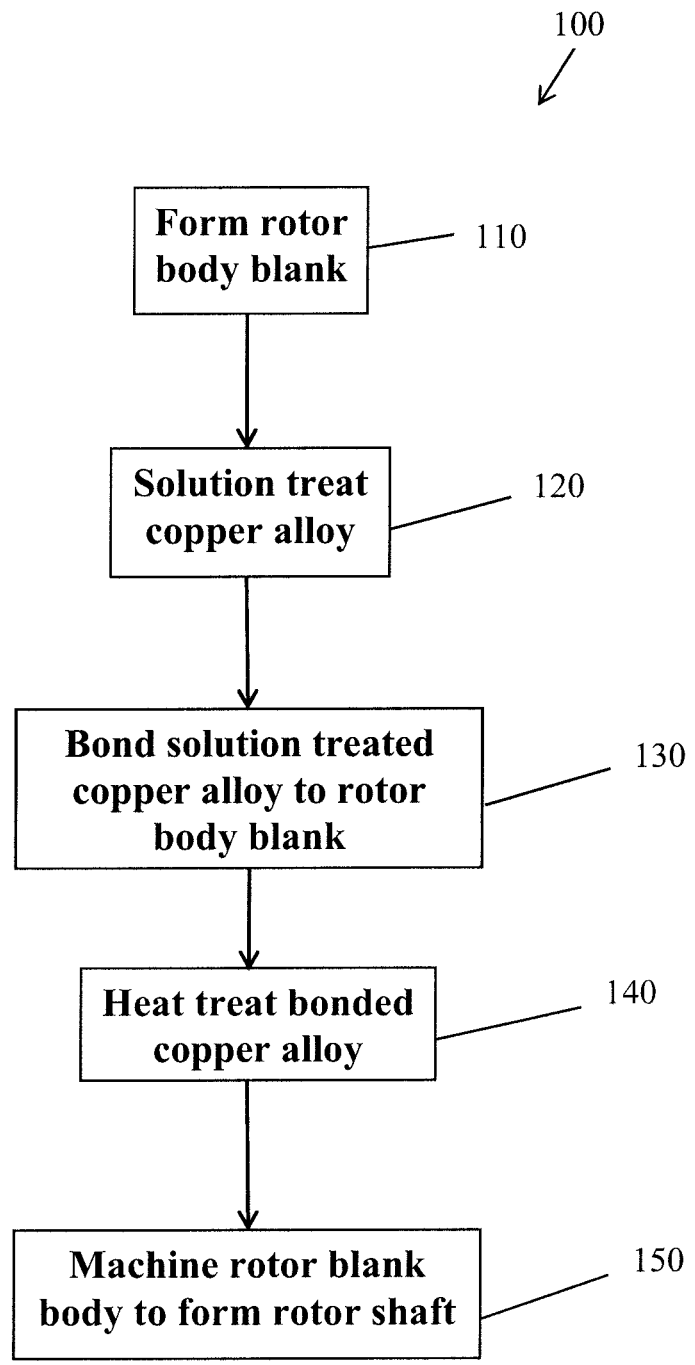
FIG. 3 is a flow diagram of a process for manufacturing a solid steel rotor shaft body that includes a copper alloy coating according to an embodiment of the present disclosure.

FIG. 3 is a flow diagram of a process 100 for manufacturing a rotor shaft 10 that includes a copper alloy coating 14 according to an embodiment of the present disclosure. At step 110, a rotor body blank 18, as shown for example in FIG. 2, is formed from a steel material. Such forming may include, for example, forging, casting, and/or machining the rotor body blank 18 to obtain a particular shape, size, and/or configuration. For example, for illustration purposes, FIG. 2 illustrates a rotor body blank 18 that has been formed, turned or otherwise milled to a diameter that is approximately equal to the largest diameter of the shaft body 12.

At step 120, a metal coating material that is to be used for the coating 14, such as, for example, an age-hardenable copper alloy, may be solution treated in preparation for age hardening after the bonding process. For example, according to certain embodiments, a copper alloy that is to be used for the coating 14 may undergo solution heat treatment. Thus, according to certain embodiments, the copper alloy may be subjected to a high temperature soak, such as, for example, being subjected to temperatures of approximately 1450-1850 degrees Fahrenheit. The duration of the high temperature soak may be based on a variety of different factors, including, for example, the thickness of the copper alloy that is undergoing the solution treatment. For example, according to certain embodiments, the copper alloy may undergo the heat soak for approximately three minutes to approximately three hours. Additionally, according to certain embodiments, the high temperature soak may be followed by air cooling or quenching of the copper alloy, such as, for example, quenching the copper alloy in a water quench. By solution treating the coating material, the coating material may be in a relatively softer condition, and thus have improved ductility and plasticity characteristics. Also by solution treating the coating material prior to bonding the coating material to the rotor body blank 18, the bonding performance and process reliability of the bond between the coating 14 and the rotor body blank 18 can be improved. Moreover, solution treating the coating material, and thereby adjusting the relative hardness of the coating material to the material of the rotor body blank 18, may allow for the bonding process to be less prone to defects. For example, the solution treatment process may increase the ductility of the coating material, thereby improving the plastic flow of the coating material. Further, by improving the plastic flow of the coating material, the bonding process may be more uniform and tolerant of parameter variations, including, for example, standoff gap and explosive velocity, among other parameters, which may thereby improve the reliability of the bond between the coating 14 and the rotor body blank 18.

At step 130, the metal coating material for the coating 14 may, while in the solution treated condition, be secured, such as, for example, bonded, to at least a portion of the rotor body blank 18 to provide a coating 14, as shown in FIG. 2. For example, according to certain embodiments, a copper alloy coating 14 may be bonded to the rotor body blank 18 using a low temperature, high integrity bonding process, such as, for example, via explosion welding or explosive bonding, diffusion bonding, or hot-isostatic pressing, among other bonding processes. Further, the improved ductility and plasticity characteristics of the solution treated coating material may reduce the propensity for cracks forming in the coating material and/or along the coating 14 and rotor body blank 18 interface from or during the application and/or bonding of the coating material to the rotor body blank 18. Such reduction in cracking may improve the overall integrity of the resulting coating 14 and/or the bond between the coating 14 and the rotor body blank 18.

At step 140, the coating 14 on the rotor body blank 18 or shaft body 12 may be heat treated. For example, according to certain embodiments, a copper alloy coating 14 may undergo precipitation hardening or age hardening so that the copper alloy of the coating 14 attains a desired strength level, hardness, and/or electrical conductivity characteristics. Such heat treating of the coating 14 at step 140 may provide the coating 14 with at least a hardened outer portion that improves the ability of the coating 14 to resist creep and fatigue, including temperature dependent creep. According to certain applications, such as, for example, high speed motor applications, the heat treatment process employed at step 140 may seek to attain a higher degree of coating 14 strength at the possible detriment of the ductility characteristics of the coating 14. Conversely, in other applications, such as, for example, applications in which the cyclic loading capability of the rotor shaft 10 may be of greater emphasis, the heat treatment process employed may be tailored to obtaining enhanced ductility characteristics of the coating 14 to the possible detriment of the hardness of the coating 14.

For example, according to certain embodiments in which the coating 14 is a copper alloy such as copper chromium, the copper alloy may be elevated to the alloy's solution precipitation temperature so that chromium is precipitated out of the solid solution. More specifically, according to certain embodiments in which the copper alloy is C18200, the copper alloy may be subjected to a temperature of approximately 795 to 935 degrees Fahrenheit for approximately two to four hours. However, the particular heat treatment process employed, and the associated procedure, may also consider core properties of the steel of the rotor body blank 18 so that the properties or mechanical characteristics of the resulting shaft body 12 are not adversely impacted by the heat treatment process. For example, age hardening of the coating 14 may occur at temperatures that seek to avoid tempering the steel material of the rotor shaft 10, and thereby prevent or minimize the age hardening process from adversely impacting core properties of the steel material of the rotor shaft 10, such as, for example, the strength of the steel, among other properties.

At step 150, the rotor body blank 18 having a coating 14 may be machined to the size, shape, and/or configuration of the rotor shaft 10. According to certain embodiments, such machining may remove at least a portion of the coating 14 that had been applied to the rotor body blank 18, as well as a portion of the steel material of the rotor body blank 18. Further, such machining may be performed before or after the coating 14 that has been applied to the rotor body blank 18 has been heat treated, such as before or after step 140. Further, according to certain embodiments in which the machining of step 150 occurs after the heat treatment process of step 140, the coating 14 remaining on the shaft body 12 may undergo further stress relieving treatment.

In one aspect, the present disclosure includes a rotor shaft for a high speed motor, the rotor shaft comprising: a shaft body configured for rotational displacement during operation of the high speed motor, the shaft body being constructed from a steel material; and a coating secured to at least a portion of an outer surface of the shaft body, the coating configured to carry an induced electrical current for the rotational displacement of the shaft body, the coating being an alloy material, the alloy material of the coating and the steel material of the shaft body being dissimilar materials.

In refining aspects, the present disclosure includes a rotor shaft, wherein the alloy material is a copper alloy; wherein the coating is secured to the shaft body by a low temperature bonding process; wherein the coating is secured to the shaft body by explosion welding; wherein the coating is an age hardened material; wherein the shaft body has a unitary construction; wherein the rotor shaft is configured to operate at a tip speed greater than 300 meters/second; wherein the rotor shaft is configured for use with a turbo-compressor that is configured for air compression; wherein the copper alloy is copper chromium; and wherein the copper alloy is copper chromium zirconium.

In another aspect, the present disclosure includes a method for manufacturing a rotor shaft for a high speed motor, the method comprising: forming a rotor body blank from a steel material; solution treating an alloy material, the alloy material and the steel material of the rotor body blank being different materials; securing the solution treated alloy material to at least a portion of the rotor body blank to provide a coating; heat treating the coating when the coating is secured to the rotor body blank, the heat treating process adapted to minimize the loss of a core property of the steel material of the rotor body blank; and machining the rotor body blank and the coating to form the rotor shaft, the rotor shaft configured for operation in a high speed motor.

In refining aspects, the present disclosure includes a method for manufacturing a rotor shaft for a high speed motor, wherein the alloy material is a copper alloy; wherein the step of securing the alloy material includes using a low temperature welding process; wherein the step of securing the alloy material includes using explosion welding to cover at least a portion of the rotor body blank with the alloy material; wherein the step of heat treating the coating includes age hardening the coating; further including the step of stress relieving the coating; wherein the rotor shaft is manufactured to operate at a tip speed greater than 300 meters/second; wherein the step of machining the rotor body blank and the coating includes forming the rotor shaft for use with a turbo-compressor that is configured for air compression; wherein the step of heat treating the coating includes enhancing the ductility of the coating; wherein the step of heat treating the coating includes enhancing the hardness of the coating; and wherein the step of heat treating includes enhancing the temperature dependent creep resistance of the coating.

While the disclosure has been described with reference to certain embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment disclosed, but that the disclosure will include all embodiments falling within the scope of the appended claims.

The invention claimed is:

1. A rotor shaft for a high speed motor, the rotor shaft comprising:
   a shaft body configured for rotational displacement during operation of the high speed motor, the shaft body being constructed from a steel material; and
   a coating secured to at least a portion of an outer surface of the shaft body, the coating configured to carry an induced electrical current for the rotational displacement of the shaft body, the coating being an alloy material, the alloy material of the coating and the steel material of the shaft body being dissimilar materials, the coating bonded to the shaft body while the coating is in a solution treated condition, the coating heat treated and thereby transformed upon bonding thereof to the shaft body, the heat treating performed in a manner so that a core property of the steel material of the shaft body is substantially preserved.

2. The rotor shaft of claim 1, wherein the alloy material is a copper alloy.

3. The rotor shaft of claim 2, wherein the coating is secured to the shaft body by a low temperature bonding process.

4. The rotor shaft of claim 3, wherein the coating is secured to the shaft body by explosion welding.

5. The rotor shaft of claim 4, wherein the coating is an age hardened material.

6. The rotor shaft of claim 5, wherein the shaft body has a unitary construction.

7. The rotor shaft of claim 6, wherein the rotor shaft is configured to operate at a tip speed greater than 300 meters/second.

8. The rotor shaft of claim 7, wherein the rotor shaft is configured for use with a turbo-compressor that is configured for air compression.

9. The rotor shaft of claim 8, wherein the copper alloy is copper chromium.

10. The rotor shaft of claim 8, wherein the copper alloy is copper chromium zirconium.

11. A method for manufacturing a rotor shaft for a high speed motor, the method comprising:
    forming a rotor body blank from a steel material;
    solution treating an alloy material, the alloy material and the steel material of the rotor body blank being different materials;
    securing the solution treated alloy material to at least a portion of the rotor body blank to provide a coating;
    heat treating the coating when the coating is secured to the rotor body blank, the heat treating process adapted to minimize the loss of a core property of the steel material of the rotor body blank; and
    machining the rotor body blank and the coating to form the rotor shaft, the rotor shaft configured for operation in the high speed motor.

12. The method of claim 11, wherein the alloy material is a copper alloy.

13. The method of claim 12, wherein the step of securing the alloy material includes using a low temperature welding process.

14. The method of claim 13, wherein the step of securing the alloy material includes using explosion welding to cover the at least a portion of the rotor body blank with the alloy material.

15. The method of claim 13, wherein the step of heat treating the coating includes age hardening the coating.

16. The method of claim 15, further including the step of stress relieving the coating.

17. The method of claim 16, wherein the rotor shaft is manufactured to operate at a tip speed greater than 300 meters/second.

18. The method of claim 16, wherein the step of machining the rotor body blank and the coating includes forming the rotor shaft for use with a turbo-compressor that is configured for air compression.

19. The method of claim 18, wherein the step of heat treating the coating includes enhancing the ductility of the coating.

20. The method of claim 18, wherein the step of heat treating the coating includes enhancing the hardness of the coating.

* * * * *